US008317584B2

(12) United States Patent
Aoki et al.

(10) Patent No.: US 8,317,584 B2
(45) Date of Patent: Nov. 27, 2012

(54) ENHANCED POKER GAME SYSTEM WITH ADDITIONAL BONUS CHALLENGES

(75) Inventors: Dion K. Aoki, Henderson, NV (US); Jeremy M. Homik, Chicago, IL (US); Joel R. Jaffe, Glenview, IL (US); Jeremie D. Moll, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 217 days.

(21) Appl. No.: 12/827,636

(22) Filed: Jun. 30, 2010

(65) Prior Publication Data

US 2011/0053671 A1 Mar. 3, 2011

Related U.S. Application Data

(60) Provisional application No. 61/222,640, filed on Jul. 2, 2009.

(51) Int. Cl.
*A63F 9/24* (2006.01)
*A63F 13/00* (2006.01)

(52) U.S. Cl. ................. 463/13; 463/11; 463/16; 463/25

(58) Field of Classification Search ............. 463/11-13; 273/292

See application file for complete search history.

(56) References Cited

U.S. PATENT DOCUMENTS

| | | | | |
|---|---|---|---|---|
| 5,851,147 A * | 12/1998 | Stupak et al. | 463/13 |
| 6,280,328 B1 | 8/2001 | Holch et al. | 463/42 |
| 6,312,332 B1 * | 11/2001 | Walker et al. | 463/23 |
| 6,517,433 B2 | 2/2003 | Loose et al. | 463/20 |
| 6,612,927 B1 | 9/2003 | Slomiany et al. | 463/16 |
| 8,202,154 B2 | 6/2012 | Elder | 463/20 |
| 2002/0034974 A1 * | 3/2002 | Wood et al. | 463/13 |
| 2002/0151354 A1 * | 10/2002 | Boesen et al. | 463/25 |
| 2003/0027626 A1 | 2/2003 | Marks et al. | 463/20 |
| 2003/0045354 A1 | 3/2003 | Giobbi | 463/40 |
| 2003/0236115 A1 | 12/2003 | Chamberlain | 463/16 |
| 2005/0124402 A1 * | 6/2005 | Miller | 463/13 |
| 2009/0258690 A1 * | 10/2009 | Tarantino | 463/13 |
| 2010/0120506 A1 * | 5/2010 | Davis et al. | 463/20 |
| 2010/0124973 A1 * | 5/2010 | DeWaal et al. | 463/20 |
| 2010/0210341 A1 | 8/2010 | Elder | 463/20 |

FOREIGN PATENT DOCUMENTS

| | | |
|---|---|---|
| WO | WO 03/083795 A1 | 10/2003 |
| WO | WO 2006/102441 A2 | 9/2006 |
| WO | WO 2007/089410 A2 | 8/2007 |

OTHER PUBLICATIONS

"Pay It Again Poker" Product Sheet, GameTech, Inc., 2 pages (Dated prior to Jul. 2, 2009).

* cited by examiner

*Primary Examiner* — Milap Shah
(74) *Attorney, Agent, or Firm* — Nixon Peabody LLP

(57) ABSTRACT

A gaming system and method for conducting a wagering game includes a display having a display area showing a poker-themed wagering game. A wager input device receives a base wager to play the poker-themed wagering game. A controller is coupled to the display and the wager input device. The controller is operative to provide a plurality of symbol-bearing objects to form a user-playable hand and award a payoff based on a ranking of the user-playable hand meeting a predetermined criterion. The controller may receive a side wager separate from the base wager from the player to trigger a challenge based on meeting a condition in at least one of a predetermined number of future plays of the wagering game. Additional free challenges may be triggered for the predetermined number of future plays.

39 Claims, 13 Drawing Sheets

ENHANCED POKER GAME SYSTEM WITH ADDITIONAL BONUS CHALLENGES

RELATED APPLICATIONS

This application claims priority from U.S. Provisional Application No. 61/222,640 filed Jul. 2, 2009 and that application is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to poker-themed wagering games with challenges based on future game plays.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Video draw poker has been played in gaming establishments for many years. In conventional video draw poker, a single player does not play against a dealer or other players, but rather attempts to achieve a highest possible poker-hand ranking. After a player makes an initial wager and is dealt five face-up cards from a standard 52-card deck, the player is allowed to discard and replace unwanted cards with replacement cards from the deck, resulting in a final card hand. The game then determines a poker-hand ranking of the final card hand and provides an award based on a pay table. The pay table includes a list of winning poker-hand rankings and the award for each ranking. The winning poker-hand rankings for a standard Jacks or Better video poker game include in order from highest to lowest: Royal Flush, Straight Flush, Four of a Kind, Full House, Flush, Straight, Three of a Kind, Two Pair and a Pair of Jacks or Better. Any poker hand having a ranking less than a Pair of Jacks or Better is a losing hand.

Manufacturers have developed variations to conventional video draw poker. One objective in developing such variations is to differentiate a video poker product from that of the competition. Another objective is to increase the speed of play and/or the number of coins or credits wagered. As casino patrons become bored or annoyed with existing variations to conventional video draw poker, gaming establishments are continually looking for new video poker games that will attract frequent play and hence increase profitability to the gaming establishment.

SUMMARY OF THE INVENTION

According to one example, a gaming system includes a display having a display area configured to display information or graphics to be displayed to a player including graphics showing a poker-themed wagering game. A wager input device receives a player input and transforms the player input into electronic data signals indicative of a base wager to play the poker-themed wagering game. A storage device is included. A controller is coupled to the display, the wager input device and the storage device. The controller is configured to execute computer instructions relating to the poker-themed wagering game operative to interpret the base wager from the data signals and to, at least in part, cause the recording of a digital representation of the base wager in the storage device. The controller is operative to provide a plurality of symbol-bearing objects to form a user-playable hand and award a payoff based on a ranking of the user-playable hand meeting a predetermined criterion. The controller is operative to receive a side wager separate from the base wager from the player to trigger a challenge based on meeting a condition in at least one of a predetermined number of future plays of the wagering game.

Another example is a gaming system includes a display having a display area configured to display information or graphics to be displayed to a player including graphics showing a poker-themed wagering game. A wager input device receives a player input and transforms the player input into electronic data signals indicative of a base wager to play the poker-themed wagering game. A storage device is included. A controller is coupled to the display, the wager input device and the storage device. The controller is configured to execute computer instructions relating to the poker-themed wagering game operative to interpret the base wager from the data signals and to, at least in part, cause the recording of a digital representation of the base wager in the storage device. The controller is configured to trigger a plurality of different challenges to a player for a predetermined number of future plays of the wagering game. The plurality of challenges includes a challenge with a condition that when met results in a bonus award having a fixed credit value to the player in addition to any payoff from the user-playable hand.

Another example is a method of conducting a poker-themed wagering game for a player. The wagering game includes a game sequence in which a player makes a wager and a wagering game outcome is determined. The wagering game is conducted using a gaming apparatus to receive inputs from the player and to generate wagering game outcomes that are communicated to the player. The gaming apparatus includes a user interface device configured to receive an input from the player, a display device configured to display information or graphics to be viewed by the player, one or more storage devices, and one or more processors configured to execute computer instructions relating to the wagering game. A player input is accepted at the user input device and the player input is transformed into electronic data signals indicative of a wager to play the wagering game, wherein a base wager is received from the player to play the wagering game. One of the gaming apparatus processors is used to interpret the wager from the data signals and to, at least in part, cause the recording of a digital representation of the wager in a gaming apparatus storage device. A gaming apparatus processor causes the display of a visual indication of the wager on the display device. One of the gaming apparatus processors initiates a game sequence of the wagering game on the gaming apparatus. A plurality of symbol-bearing objects to form a user-playable hand is provided via the one or more processors. A payoff is awarded based on a ranking of the user-playable hand meeting a predetermined criterion. An extra wager separate from the base wager is received from the player to trigger a challenge based on meeting a condition in at least one of a predetermined number of future plays of the wagering game. An outcome of the game sequence is determined.

A further example is a method of conducting a poker-themed wagering game for a player. The wagering game includes a game sequence in which a player makes a wager and a wagering game outcome is determined. The wagering game is conducted using a gaming apparatus to receive inputs from the player and to generate wagering game outcomes that are communicated to the player. The gaming apparatus includes a user interface device configured to receive an input from the player, a display device configured to display information or graphics to be viewed by the player, one or more storage devices, and one or more processors configured to execute computer instructions relating to the wagering game. A player input is accepted at the user input device and the player input is transformed into electronic data signals indicative of a wager to play the wagering game, wherein a base wager is received from the player to play the wagering game. One of the gaming apparatus processors is used to interpret the wager from the data signals and to, at least in part, cause the recording of a digital representation of the wager in a gaming apparatus storage device. A gaming apparatus processor causes the display of a visual indication of the wager on the display device. One of the gaming apparatus processors initiates a game sequence of the wagering game on the gaming apparatus. A plurality of symbol-bearing objects to form a user-playable hand is provided via the one or more processors. A payoff is awarded based on a ranking of the user-playable hand meeting a predetermined criterion. A plurality of different challenges to a player is triggered for a predetermined number of future plays of the wagering game. The plurality of challenges includes a challenge with a condition that when met results in a bonus award having a fixed credit value to the player in addition to any payoff from the user-playable hand. An outcome of the game sequence is determined.

Additional examples will be apparent to those of ordinary skill in the art in view of the detailed description of various embodiments, which is made with reference to the drawings, a brief description of which is provided below.

DETAILED DESCRIPTION

Figure 1A:
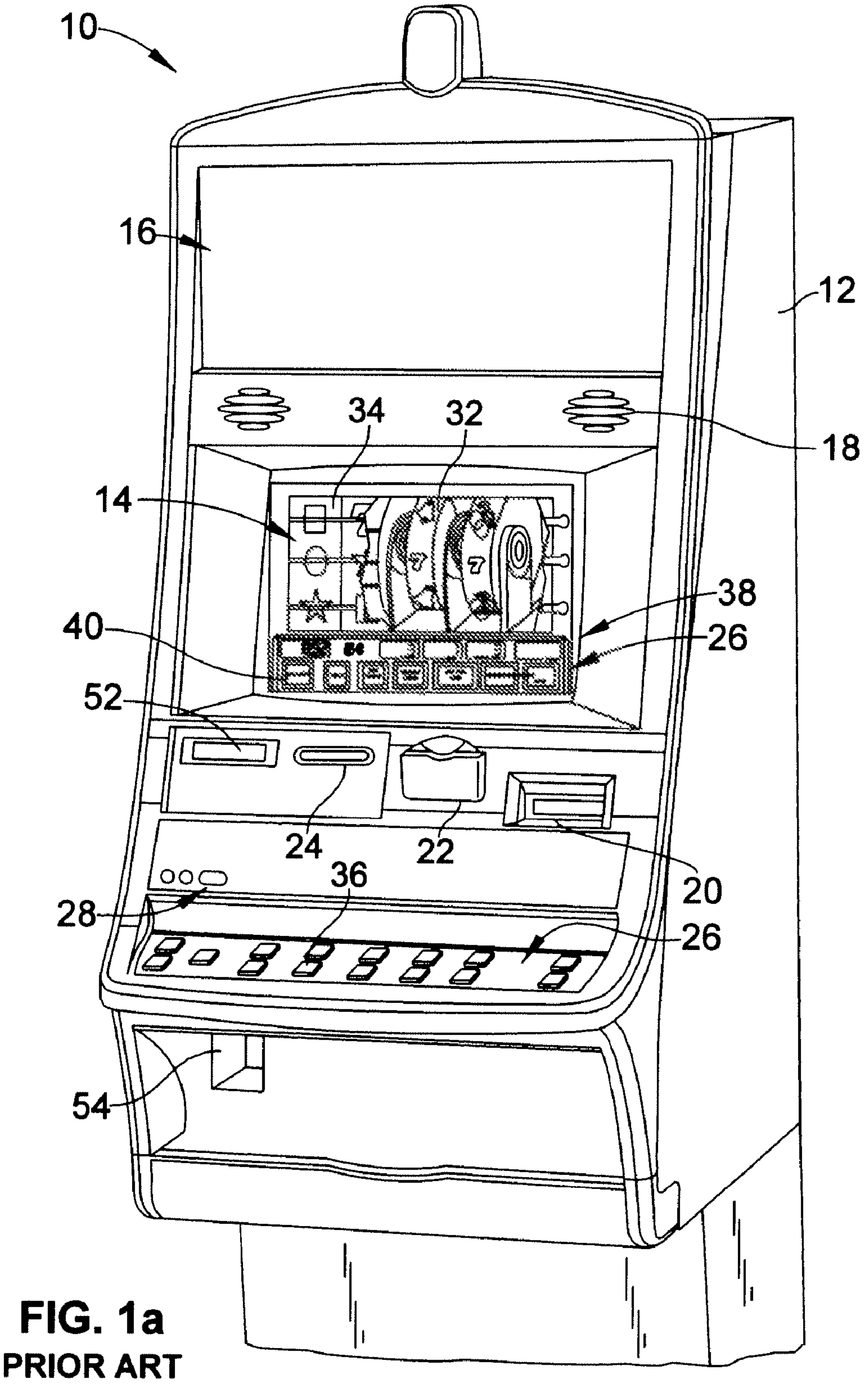
FIG. 1a PRIOR ART
FIG. 1*a* is a perspective view of a free standing gaming machine.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
FIG. 1b PRIOR ART
FIG. 1*b* is a perspective view of a handheld gaming machine.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
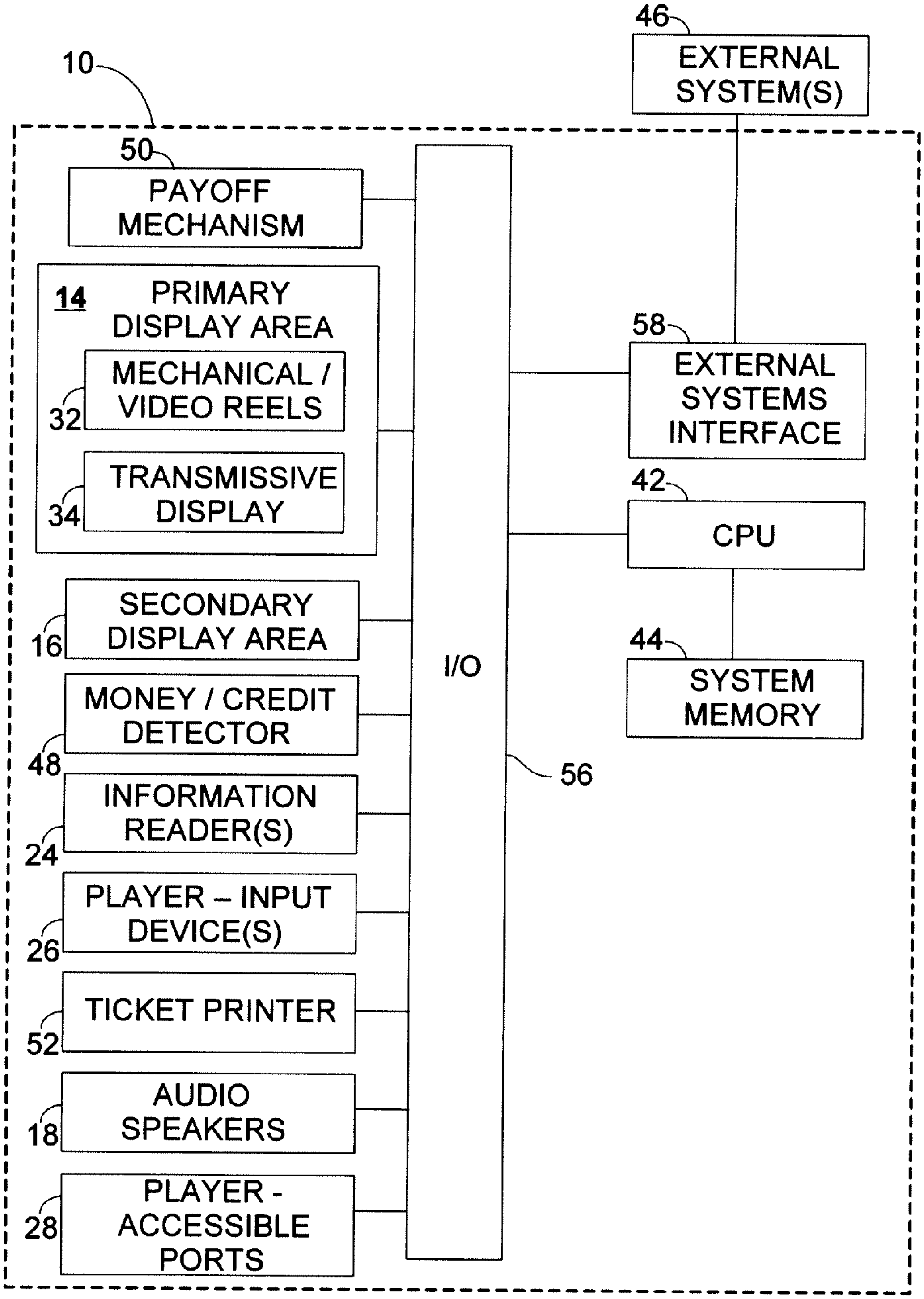
FIG. 2 PRIOR ART
FIG. 2 is a block diagram of a control system suitable for operating the gaming machines of FIGS. 1*a* and 1*b;*

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game (s), or via an external game or event. The payoff may be provided in the form of money, redeemable points, services or any combination thereof. Such payoff may be associated with a ticket (from a ticket printer 52), portable data unit (e.g., a card), coins (from a coin outlet 54 shown in FIG. 1*a*), currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
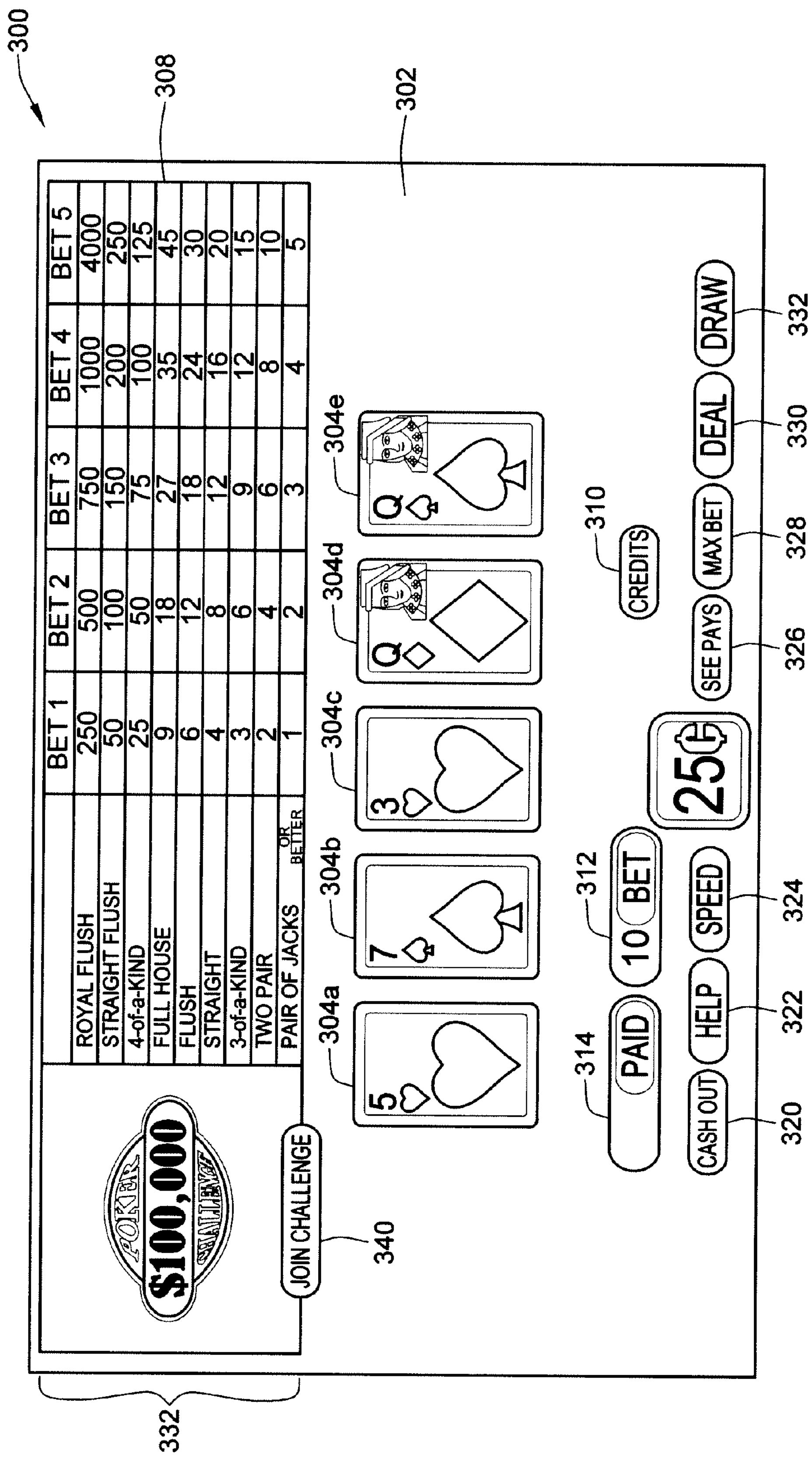
FIG. 3 is an image of a video poker-game screen shown on the display of the gaming machine in either FIG. 1*a* or FIG. 1*b;*

Turning now to FIG. 3, an image of a video poker-game screen 300 which can be displayed on the primary display area 14 in FIG. 1*a* is illustrated. A player begins play of a basic wagering game by making a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

According to one example, a video poker game is preferably played with a single standard 52-card deck (i.e., Ace through King of four different suits). The standard 52-card deck may then be supplemented with one value symbol-bearing object (in the illustrated example, a value card). According to another embodiment, a card is selected from the single standard 52-card deck, and the selected card serves as the value object. However, a poker game may be played with any number of decks and/or with a variety of different card compositions (e.g., additional value objects, wild cards, etc.).

According to one example, during a particular poker hand, all of the cards are dealt from the same deck. After a card is dealt from the deck into the poker hand, the card is "used up" and cannot appear again until the next poker hand. The deck may be replenished and randomly shuffled prior to every poker hand. The system memory 44 includes a data structure for storing data representing each card of the deck. The controller 42 randomly selects cards for each poker hand from the data structure and controls the primary display area 14 to display the cards.

The main poker-game screen 300 featuring a basic wagering game such as a five-card draw poker game in this example may be displayed on the primary display area 14. In the illustrated embodiment, the main poker-game screen 300 is used to display a user-playable hand 302 composed of a plurality of cards 304*a-e*. The main poker-game screen 300 also displays a pay table 308, game-session meters, and various buttons selectable by a player.

The game-session meters include: a "credits" meter 310 for displaying a number of credits available for play on the machine; a "bet" meter 312 for displaying a number of credits wagered (e.g., from 1 to 5 credits); and a "paid" meter 314 for displaying an amount to be awarded based on the results of the particular round's outcome. The player-selectable buttons include a "cash out" button 320 to collect the credits remaining in the credits meter 310; a "help" button 322 for viewing instructions on how to play the video poker game; a "speed" button 324 for allowing a player to adjust the speed that the cards are dealt, the hands are formed, the length of time the winning hand is displayed, the length of time the winnings are displayed, the overall speed of the game, etc.; a "see pays" button 326 for displaying a larger pay table to the player (or displaying the pay table in embodiments where the pay table is not constantly displayed); a "max bet" button 328 for wagering a maximum number of credits (e.g., 5 credits); a "deal" button 330 for causing the game to initially deal cards from a deck into the user-playable hand 302 face-up; and a "draw" button 332 for causing the game to replace any non-held card in the user-playable hand 302 with another card from the deck.

The pay table 308, shown on the primary display area 14, may also or alternatively be displayed on the secondary display area 16 in FIG. 1*a*. The pay table 308 includes a list of winning-poker-hand rankings 332 and a plurality of payout columns with payouts associated with each ranking. The number of credits won is linearly proportional to the number of credits wagered, except that a royal flush typically yields a bonus when achieved on a maximum wager. The list of winning poker-hand-rankings 332 includes standard poker-hand rankings beginning at a pair of jacks or better and includes hands through a royal flush. The gaming terminal 10 in FIG. 1*a* or the handheld terminal in FIG. 1*b* may be configured to offer the player the above-mentioned basic wagering game.

According to one example, the basic wagering game is five-card draw poker. In a five-card draw poker game, five cards 304*a-e* are displayed face-up to a player to form a first user-playable hand. The player is able to select none, one, or a plurality of the cards 304*a-e* in the user-playable hand to hold. However, the player generally will hold any winning cards (e.g., either card 304*d* or card 304*e* because they form a pair of queens, which form a hand specified in the pay table 308). In this embodiment, if the first user-playable hand were to form a five-card straight or flush, full house, etc., and the player held all five of the dealt cards, the player would be awarded a payout and the gaming session would end. However, where one or more of the cards are not selected to be held, the non-selected card or cards may then be replaced to form a second user-playable hand—which is some examples is also the final user-playable hand.

Figure 4:
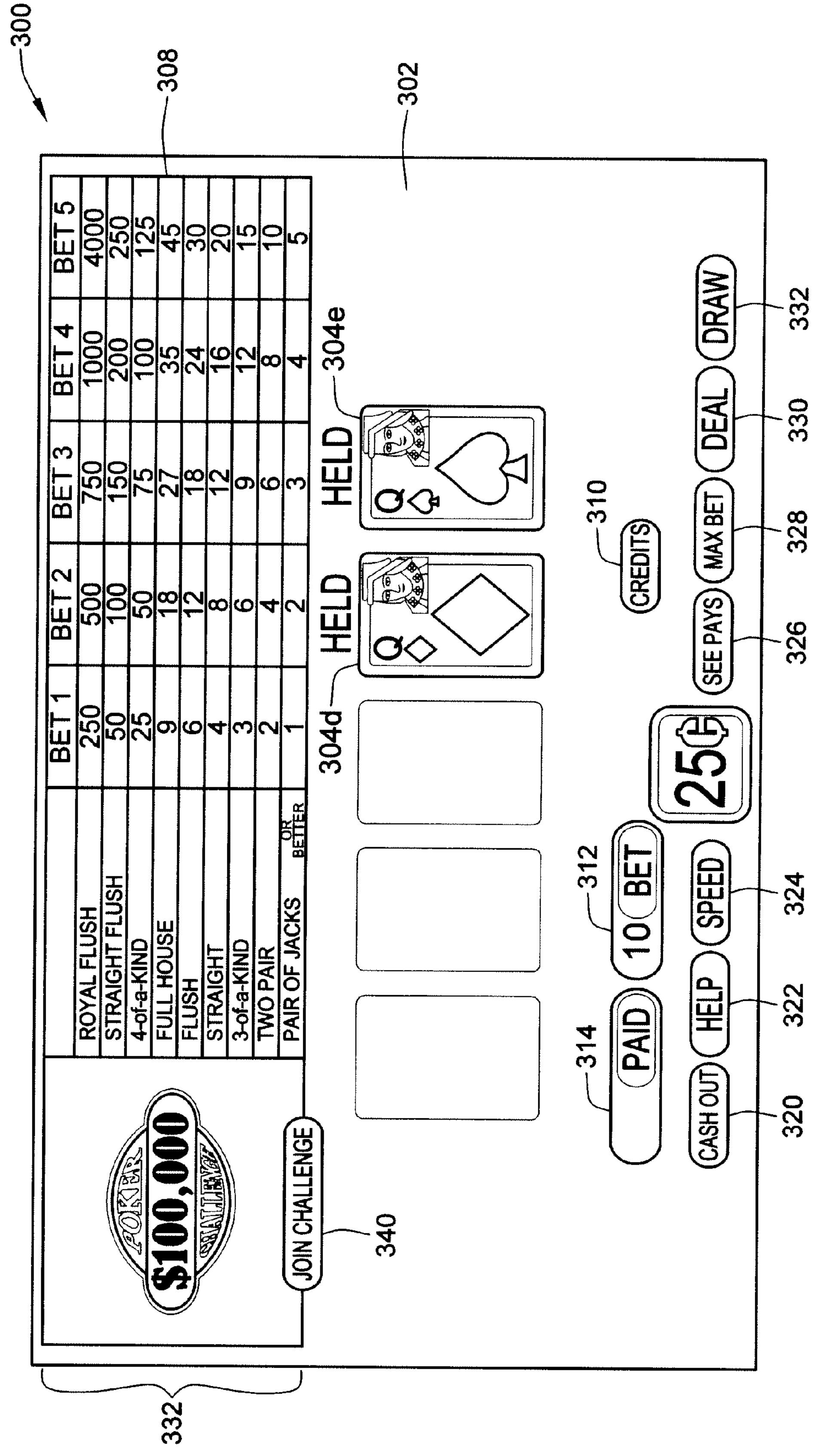
FIG. 4 is an image of the video poker-game screen in FIG. 3 showing the example poker-themed wagering game after a player selection of cards to discard.
Figure 5:
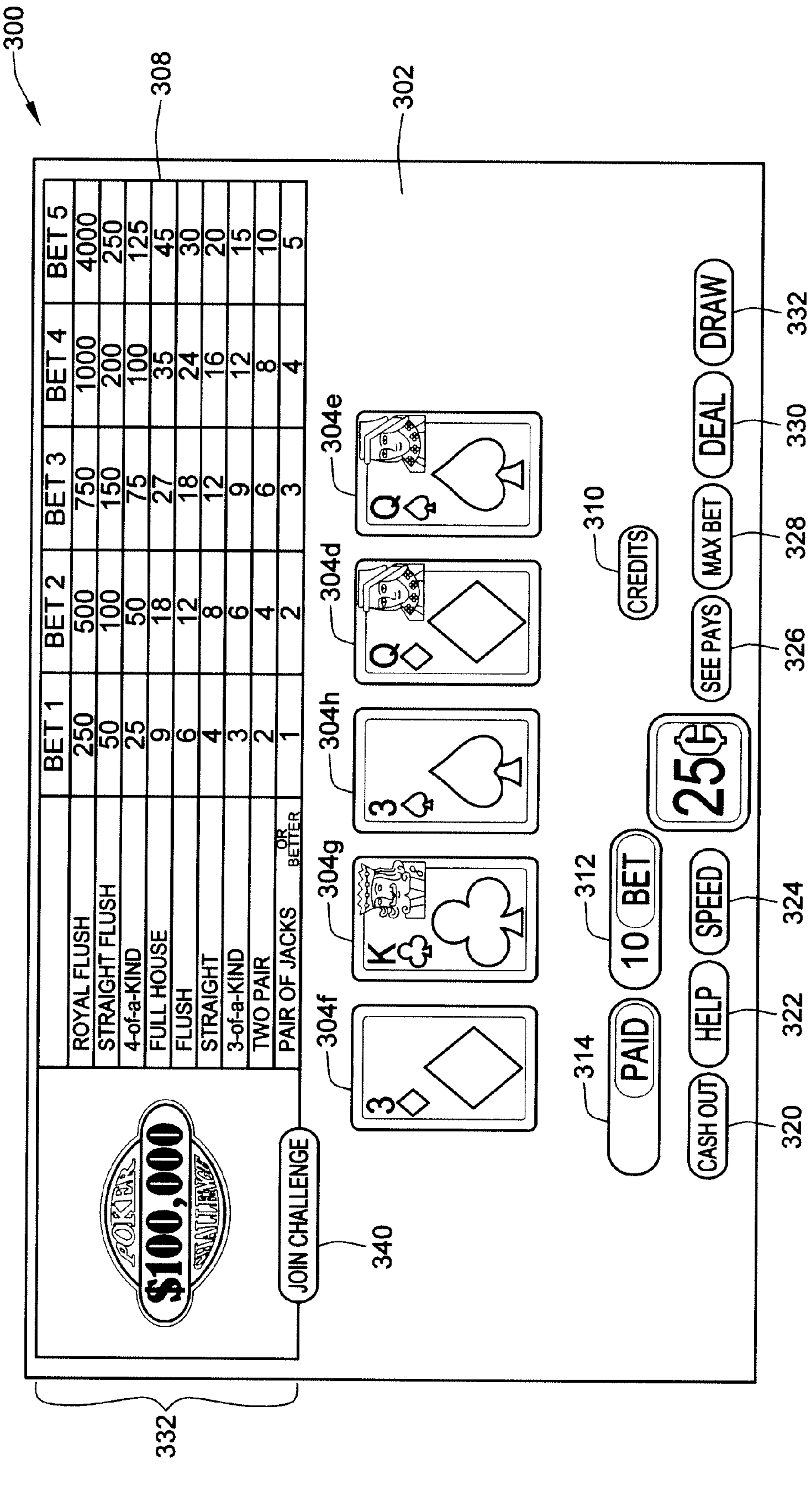
FIG. 5 is an image of the video poker-game screen in FIG. 3 showing the example poker-themed wagering game after replacement cards have been added to form a playable hand.

FIG. 4 is an image of the video poker game in FIG. 3 showing the example poker-themed wagering game after a player has selected cards to hold. FIG. 5 is an image of the video poker game in FIGS. 3-4 showing the example poker-themed wagering game after replacement cards have been added to form a playable hand. In FIG. 4, a player has selected two cards 304*d*, and 304*e* to hold. As illustrated in FIG. 5, the three discarded cards 304*a*, 304*b*, 304*c* are replaced with three additional cards 304*f*, 304*g*, 304*h*—randomly selected from the remaining deck—to form a second or final user-playable hand.

At the end of the basic wagering game, the highest-ranked poker hand is determined from the final user-playable hand and a player is awarded a primary payoff as displayed in the pay table 308 if the ranking of the user playable hand meets the predetermined criteria displayed in the pay table 308.

The basic wagering game shown in FIGS. 3-5 may be enhanced by bonus challenges according to one of the present examples. In this example, add-on features or challenges for subsequent future basic wagering games or plays may be triggered by the player via an input such as a join challenge button 340 in FIG. 3. It should be understood that the example basic wagering game in FIGS. 3-5 is a "draw" poker type wagering game, but the add-on features and challenges for basic wagering games may be added to any poker-themed game including but not limited to wagering games based on stud, Hold-em or Omaha poker. Certain buy-in challenges require the player to place an additional side wager or ante separate from the base wager to be provided the opportunity to trigger the challenge. The challenge is based on meeting a condition in at least one of a predetermined number of future plays of the wagering game as will be explained below. Other free challenges may be triggered without an extra wager based on predetermined free-challenge criteria that are met in the basic game such as a certain hand type. The additional side wager to trigger a challenge may be made by the player as an add-on bet or alternatively, the player may elect to exchange part of previous awards from the basic wagering game for the additional wager to trigger the challenge. Alternatively, if a player receives an award for a certain combination or hand such as four of a kind, they may be offered the opportunity to make a side wager or take part of the award for the combination for an additional challenge for future hands or plays.

In this example, a super jackpot buy-in challenge offers a player the opportunity to be awarded a large jackpot over a fixed or predetermined number of future plays or hands in the basic wagering game. The large jackpot may be awarded for meeting a challenge condition or conditions over the predetermined number of future plays or hands in the basic game. Other examples of buy-in challenge features that offer varying amounts of hand eligibility and awards may include challenges to collect different hands and win combinations in the predetermined number of future plays. For example, challenge conditions may include a number of cumulative winning hands, back-to-back wins and bingo-style wins where a player must get one of each type of qualifying hand to win the bonus award. The bingo-style wins may include the requirement of achieving a set of hands in a set order: e.g., getting three-of-a-kind in all the ranks 2 through Ace, in order (first three 2's, then three 3's, then three 4's, etc.). Another challenge condition may be for countdown wins that require cumulative wins over a small window of hands and numbered wins where every repeat of a certain hand or over a number of plays contributes to meeting the challenge. Meeting the challenge condition awards the player additional bonus amounts over the awards normally available in the basic game.

Figure 6:
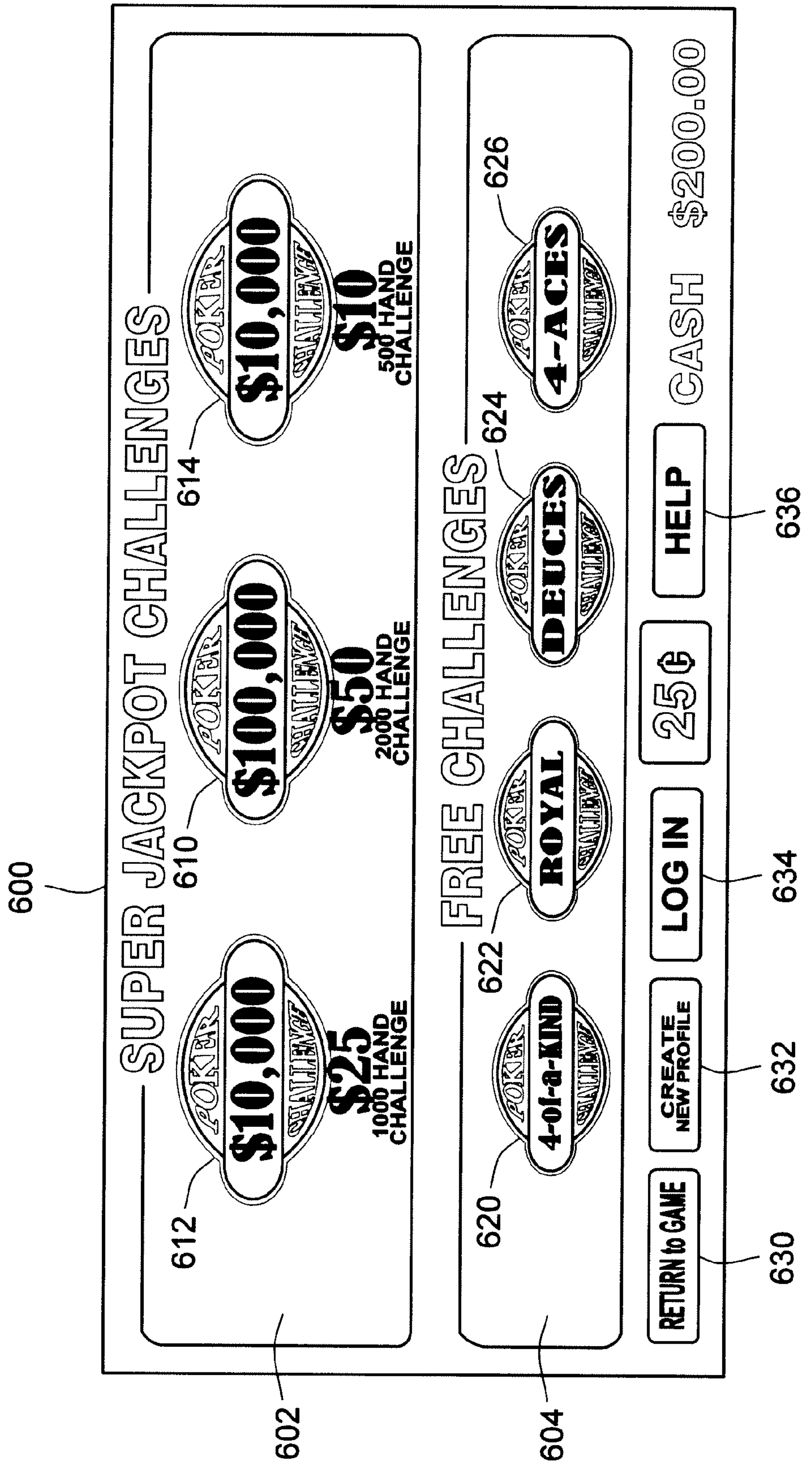
FIG. 6 is an image of a challenge screen of the video poker game shown on the display of the gaming machine in FIG. 3 that allows player selection of various challenges.

For example, FIG. 6 shows a challenge screen 600 that is an example of a presentation of a super jackpot challenge field 602 that includes buy-in challenges that may be purchased for a certain ante or additional wager and a number of free challenges summarized in a free-challenge field 604. The challenge screen 600 may be displayed on the secondary display area 16 or preferably the primary display area 14 in FIG. 1 in response to a player selecting the join challenge button 340 in FIG. 3. The super jackpot challenge field 602 shows three super jackpot challenge options 610, 612 and 614. The super jackpot options 610, 612 and 614 require an ante of a certain amount that may be scaled for different numbers of hands of eligibility to meet the challenges. In this example, the first super jackpot option 610 requires an ante or additional wager of $50 that will create 2,000 max bet hands of future plays to meet the challenges including winning the super jackpot. In this example, the super jackpot may be a fixed amount such as $100,000 or a wide area progressive allowing contributions from numerous gaming terminals. Other levels of jackpots may be offered for a smaller ante and for less hands of eligibility. For example, a second challenge option 612 may require a $20 ante for 1,000 hands and offer a fair amount of volatility. This challenge jackpot may be configured as a fixed jackpot such as $10,000 in this example or a local area progressive. Another lower level challenge option 614 may require a $10 ante for 500 hands and provide the least level of volatility. The lower level challenge option 614 awards a $1,000 jackpot in this example but may be configured as a local area progressive or a SAP.

The free-challenges field 604 includes a number of example free challenges 620, 622, 624 and 626 that are persistent state challenges for all future max bet plays of the basic wagering game in this example. The free-challenge field 604 includes a 4-of-a-kind challenge 620, a royal flush challenge 622, a deuces challenge 624 and a four aces challenge 626.

The free challenges 620, 622, 624 and 626 are persistent state features that do not require an additional wager by the player and are triggered by specific outcomes in the basic wagering game. Of course any of these challenges may have enhanced rewards, and the opportunity for that challenge may alternatively be purchased with an additional wager such as an ante. The free challenges may also award eligibility for the jackpot challenges explained above. In this example, the free challenges are triggered by a qualifying hand meeting a predetermined free-challenge criteria in the basic game. The free challenges may also be unlocked from a certain combination of wins such as three wins in a row or other free-challenge conditions.

Once triggered, the player is given a challenge condition to meet to win the challenge in a certain number of hands. As an alternative, the player may be offered the option to take a reduced payout to potentially win a higher amount or allow the player to provide an ante to be granted the challenge opportunity. Once the player meets the challenge condition, they are awarded a bonus according to the specific challenge. In this example, the 4-of-a-kind free challenge 620 is triggered by any 4-of-a-kind pay in the basic wagering game. The player is given 100 future plays to win another 4-of-a-kind for a bonus credit amount. In this example, the royal flush free challenge 622 is triggered by any royal flush pay and the player is given 500 future plays to win another royal flush for a bonus credit amount. In this example, the deuces free challenge 624 is triggered by a 4-deuces pay in the basic game and the player is given 500 future plays to obtain another four deuces. The four aces free challenge 626 is triggered by a four aces pay in the basic game and the player is given 500 future plays to obtain another four aces. Of course other free challenges may be offered for other hands in the paytable 208 in FIG. 3 or other combinations. The free challenges may be for different numbers of future plays and pay differing bonus amounts. Once the player meets the challenge condition, the feature is ended. Alternatively, if the player completes the challenge condition within the fixed amount of hands, then an additional challenge may be unlocked.

The unlockable challenges may be provided in addition to the free challenges. Such challenges may be unlocked after meeting certain conditions under a free challenge, obtaining certain ranks or playing a certain number of hands. Each additional challenge may become progressively more difficult to obtain with a correspondingly higher award.

The challenge screen 600 in FIG. 6 also includes a return to game button 630, a create new profile button 632, a log in button 634 and a help button 636. The return to game button 630 returns to the basic wagering game shown in FIGS. 3-5. The create new profile button 632 and the log in button 634 allow a player to access persistent state information as will be described below.

Figure 7:
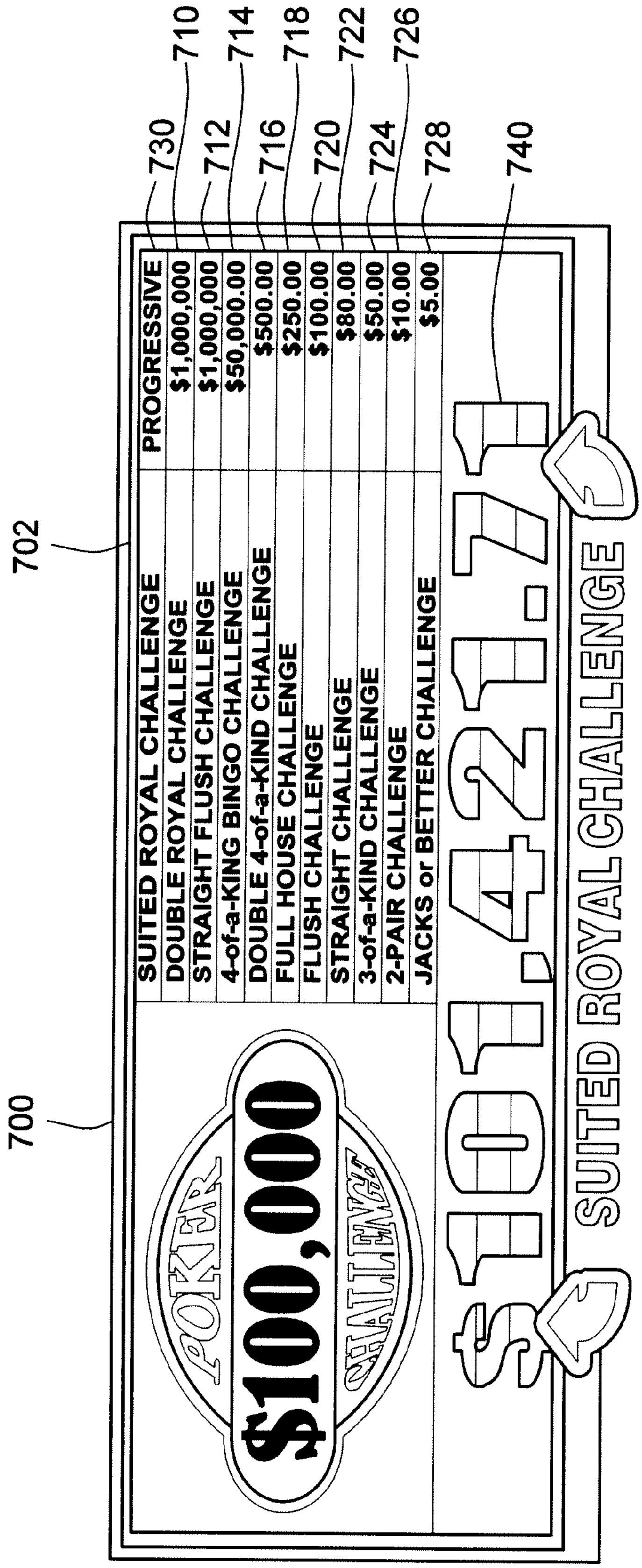
FIG. 7 is an image shown on the display of the gaming machine in either FIG. 1*a* or FIG. 1*b* of a challenge information screen that provides player information relating to various challenges.

FIG. 7 is an image of a challenge information game screen 700 which is preferably displayed on the secondary display area 16 of FIG. 1 when one of the buy-in challenge options 610, 612 or 614 is selected in FIG. 6. In this example, a player has selected the maximum buy-in challenge option 610. Examples of jackpot challenges are listed on a challenge summary table 702 in the display screen 700 in FIG. 700. Any of the challenges in the summary table 702 may be met during the fixed plurality of future plays of the basic wagering game in the challenge. In this example, a player has 2,000 hands or plays for meeting any of the listed challenges. The challenge summary table 702 includes a double royal challenge 710, a straight flush challenge 712, a 4-of-a-kind Bingo challenge 714, a double 4-of-a-kind Bingo challenge 716, a full house challenge 718, a flush challenge 720, a straight challenge 722, a 3-of-a-kind challenge 724, a 2-pair challenge 726 and a jacks or better challenge 728. The respective payouts for each of the challenges 710, 712, 714, 716, 718, 720, 722, 724, 726 and 728 are also listed in the summary table 702. For example the full house challenge 718 has a bonus award of $250 for receiving a number of full houses in the future plays. Certain of the challenges may require a combination of outcomes of the basic game. For example, the double 4-of-a-kind challenge 716 requires the occurrence of two 4-of-a-kinds while the double royal challenge requires the occurrence of two royal flushes during the plurality of future plays of the challenge. In this example, a progressive jackpot as shown in a progressive jackpot amount 740, is offered for a suited royal challenge 730 in table 702. A player must receive a royal flush in each of the four suits during the fixed plurality of future plays to trigger the progressive jackpot 740.

Figure 8:
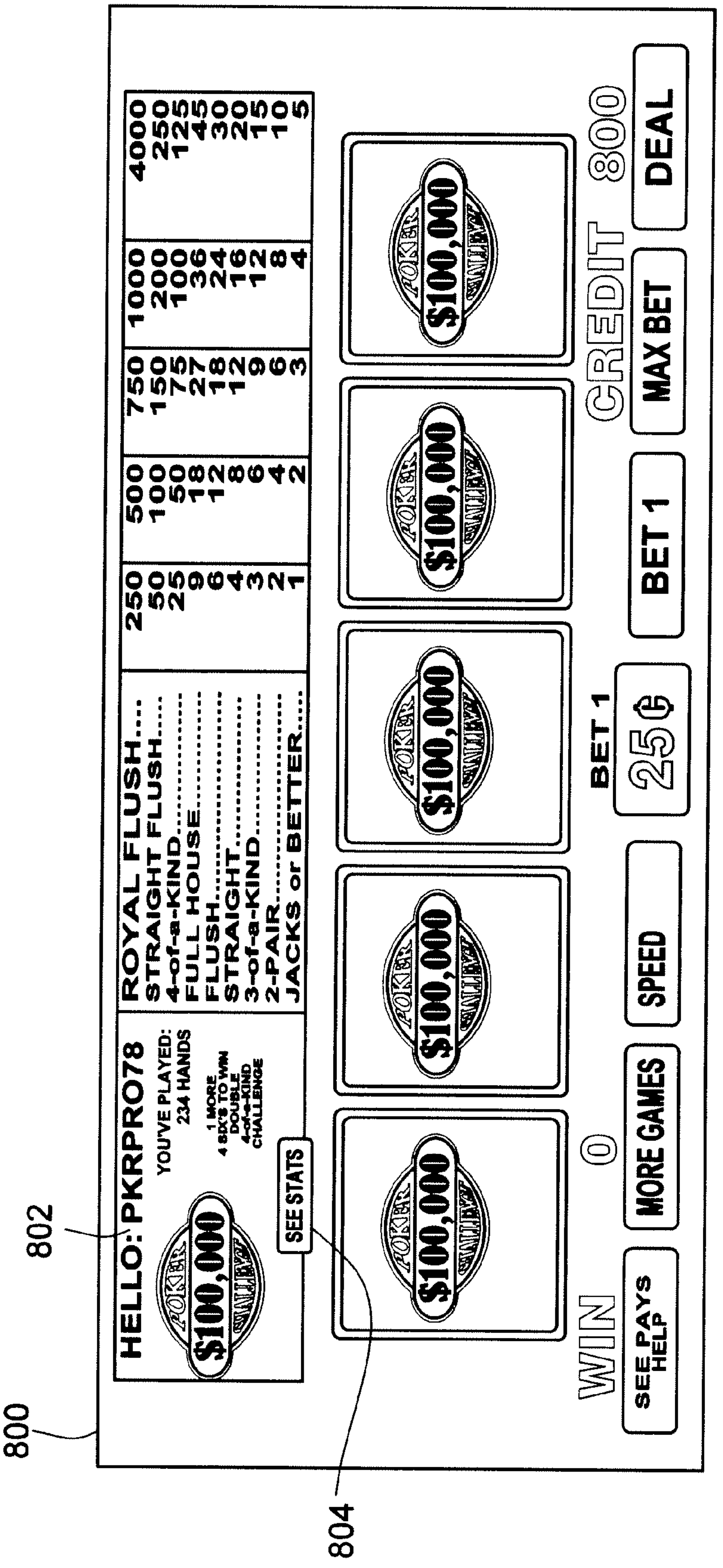
FIG. 8 is an image of the video poker screen in FIG. 3 showing a summary area of a pending challenge.

FIG. 8 is an image of a video poker-game screen 800 similar to the basic game displayed in FIG. 3 which may be displayed on the primary display area 14 whenever a challenge is activated. A challenge status section 802 includes information on the current challenge including the number of plays remaining in the predetermined number of future plays of the current challenge and the types of hands needed to complete the challenges. The status data may be displayed on a separate screen via the selection of a status button 804. The maximum jackpot challenge may be triggered via an enter challenge button 340 in FIG. 3 that accepted an additional player wager of $200 in this example.

In addition, random modifiers may be added to the super jackpot challenges. Such modifiers may include increased payouts for short intervals of hands or by time, or random pay increases for collected hands. For example, once a player has accumulated a certain number of hands, the payout of the max bet of that hand may increase.

Further the challenges may be made cumulative and extra bonus awards may be offered for a parlay of more than one challenge during an interval of hands.

The challenge awards may be in the form of enhanced gameplay for other plays. Such an enhancement may be provided in addition or apart from a normal credit based award for the challenge. The enhanced gameplay may provide a player with a second try to draw at a big hand if a player has several cards that may form a big hand. Another variation may be to allow intermediate awards that extend the number of hands available to meet the primary challenge. Another award may be a discount on future hands played. Such a discount may be uniform or it may depend on the outcome of the play, providing a greater discount for hands that do not result in a winning outcome.

Figure 9A:
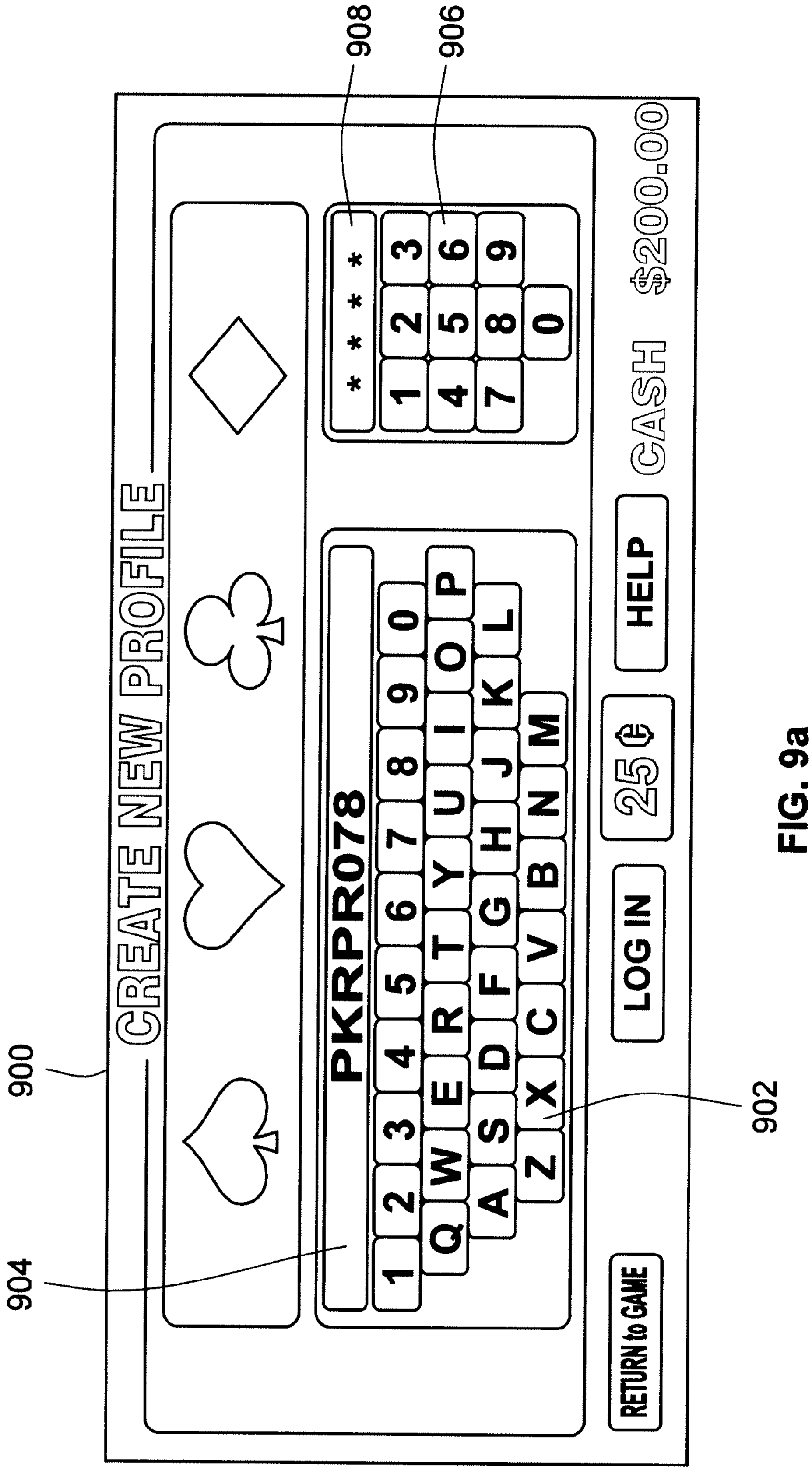
FIG. 9*a* is an image of an input screen shown on the display of the gaming machine in either FIG. 1*a* or FIG. 1*b* that allows a player to enter individual identification data.

As explained above, challenges may be extended over multiple gaming sessions. FIG. 9*a* shows an input screen 900 that is activated by selecting the create profile button 632 in FIG. 6. The input screen 900 allows a player to create an account such that the gaming system may track a player's current session, overall history and progress on the current challenge. The input screen 900 includes an alpha numeric keyboard 902, a profile name field 904, a numerical keypad 906 and a hidden password field 908. The player may use the keyboard 902 and keypad 906 to create or edit a user identification and password. Once the user identification and password is created, a player may continue their progress for existing challenges over the number of future plays by returning to the gaming system and entering their user identification and password. Once this data is verified, the gaming system will restore the status of the challenge for the player. Thus, a challenge will remain active if the player returns at a future time to continue playing the predetermined number of future plays.

Figure 9B:
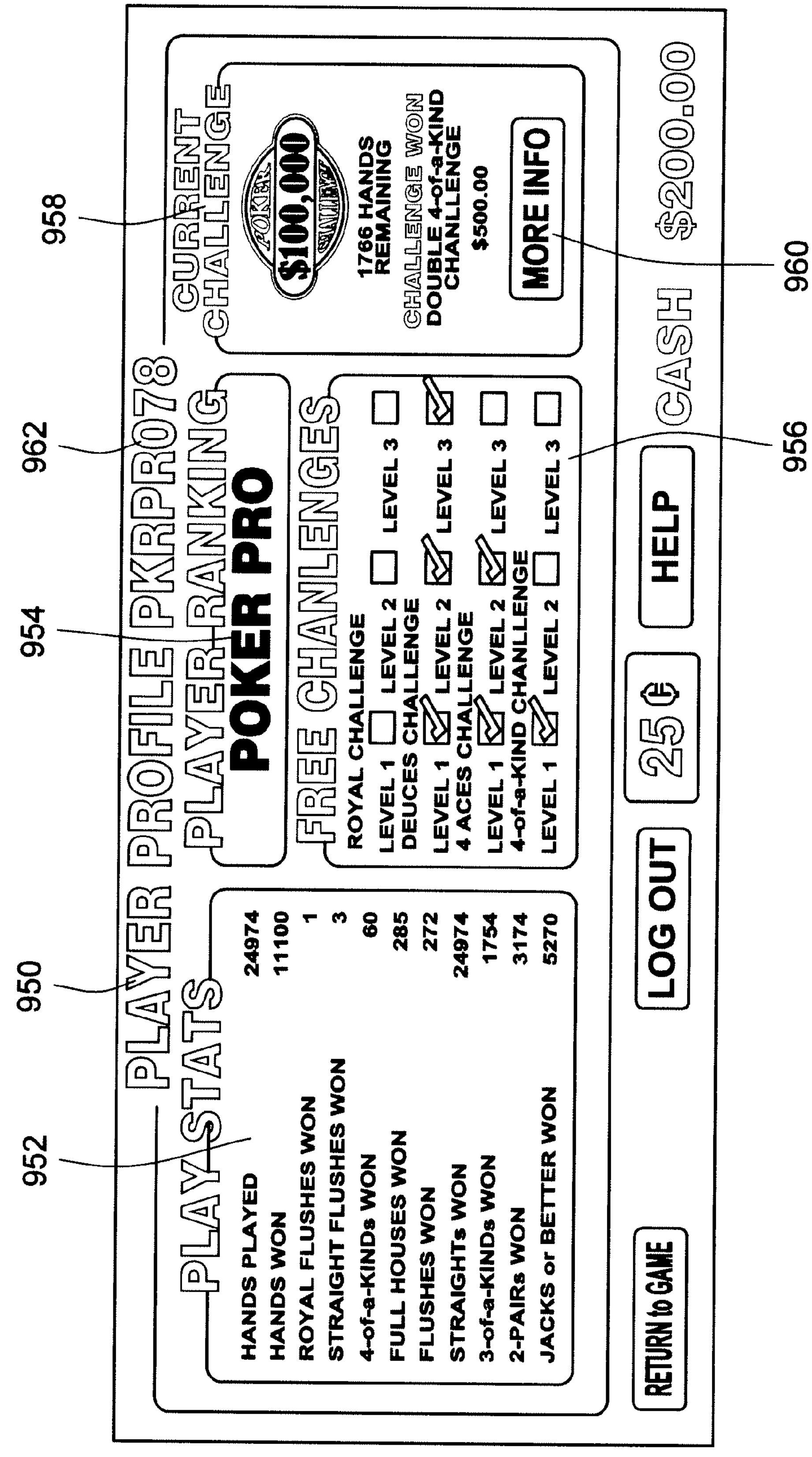
FIG. 9*b* is an image of a challenge summary screen shown on the display the gaming machine in either FIG. 1*a* or FIG. 1*b* that shows individual data for a player regarding the status of challenges for that player.

FIG. 9*b* shows the resulting summary screen 950 that is presented to a player after entering their identification information through the log in button 634 in FIG. 6 or by selecting the stats button 804 in FIG. 8. The summary screen 950 includes a statistics display field 952, a ranking field 954, a free-challenges field 956, and a current challenge field 958. The statistics field 952 displays the number of hands played and won by the player as well as the number of each types of winning hands the player has won. The ranking field 954 indicates a player rank in terms of completed challenges. This may include a range of titles such as beginner, amateur, poker pro, superstar, etc. The player ranking may be compared to other players if the challenges are used in a form of tournament competition. The free-challenges field 956 displays a list of the completed free challenges and the level of difficulty for the challenge. For example, Level 1 might be to complete a challenge in 100 hands; Level 2 might be the same challenge in 60 hands; and Level 3 might be 30 hands. The current challenge field 958 summarizes the current buy-in challenge and the number of hands remaining to complete the challenge as well as challenges that have been completed. A more information button 960 will return to the information screen shown in FIG. 7. The player identification 962 is displayed at the top of the screen 950.

The challenges may also be tailored to individual player preferences or players may be offered a range of challenges. For example, certain challenges may be directed to allow more strategic or game playing alternatives to appeal to "poker" players. An example of such a challenge is a challenge that provides the player with an additional bonus of hands with Aces causing a player to alter their strategy to attempt to obtain such hands. Other challenges may be based on more random occurrences which may appeal to players that prefer greater volatility and risk taking.

Additional features may be given to a player external in the form of game add-ons that may be applied to any eligible game allowing a player to block wager. Such add-ons may include physical tokens or additional credits on a player account as described above with reference to FIGS. 9*a* and 9*b*.

One example of a game add-on is a charm that may by a physical object with an RFID to allow identification of the value of the charm. Such charms may be physical objects that may be dispensed through a dispenser machine made available for the players. One level of charms may be a "silver" charm that modifies games for fixed amount of maximum bet hands. The "silver" charm enhancements may include enhanced payouts, increasing the number of types of fixed hands that are part of a winning combination and free hands. A second type of charm may be a "gold" charm that modifies games for as long as a player is logged in using the charm. The "gold" charm may enable modifications such as boosted pay tables, optimal strategy hints or a special cumulative bonus.

Another player add-on may include a promotional card such as an "Edge" card available from WMS Gaming, Inc. Such cards may have themes relating a particular wagering game or games. Inserting such a card in the particular wagering game or games may allow enhanced play such as an extra selection or enhanced boosted pay tables, optimal strategy hints or a special cumulative bonus.

Figure 10A:
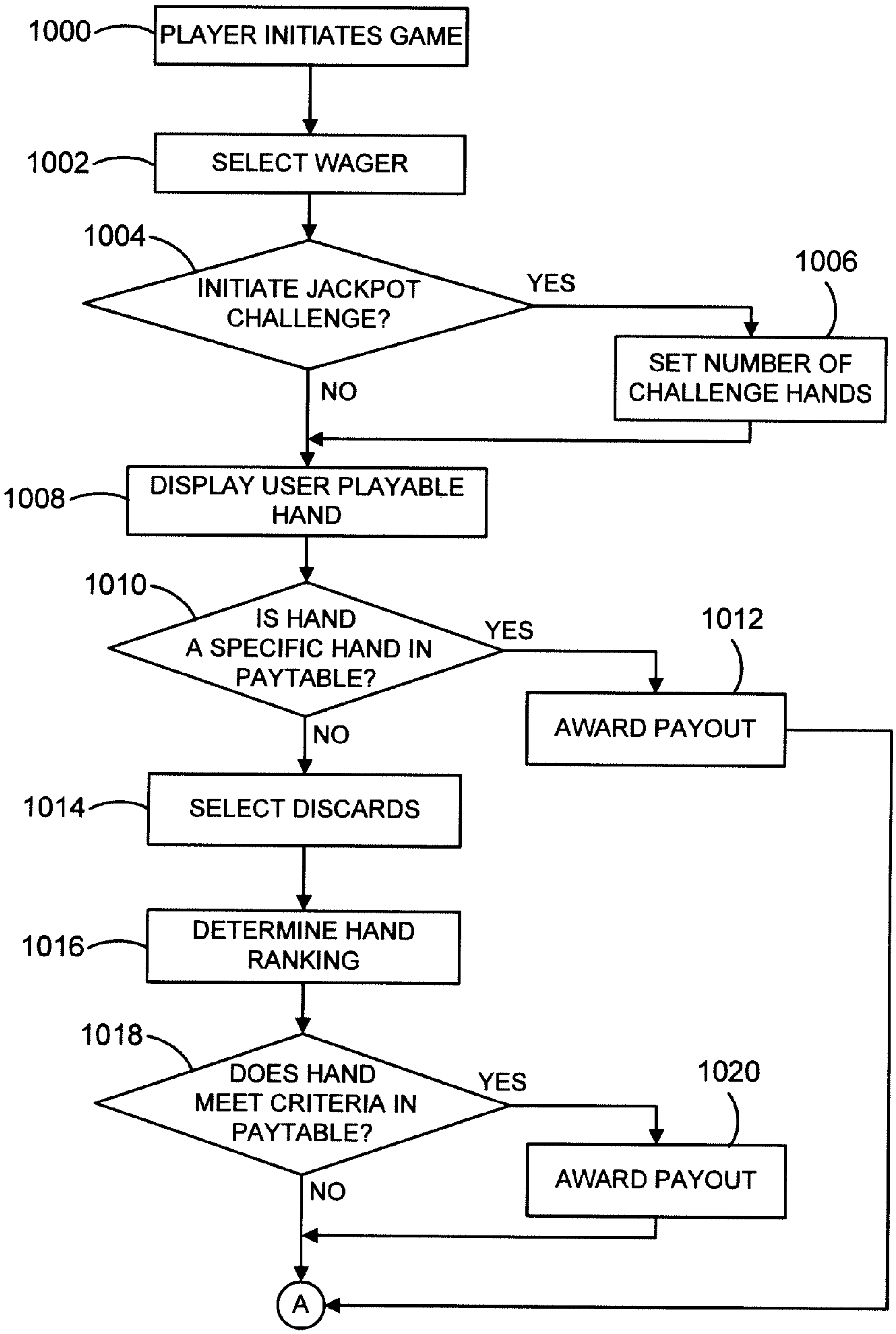
FIGS. 10*a*-10*b* are a flowchart for an algorithm that corresponds to instructions executed by a controller in accord with at least some aspects of the disclosed concepts.
Figure 10B:
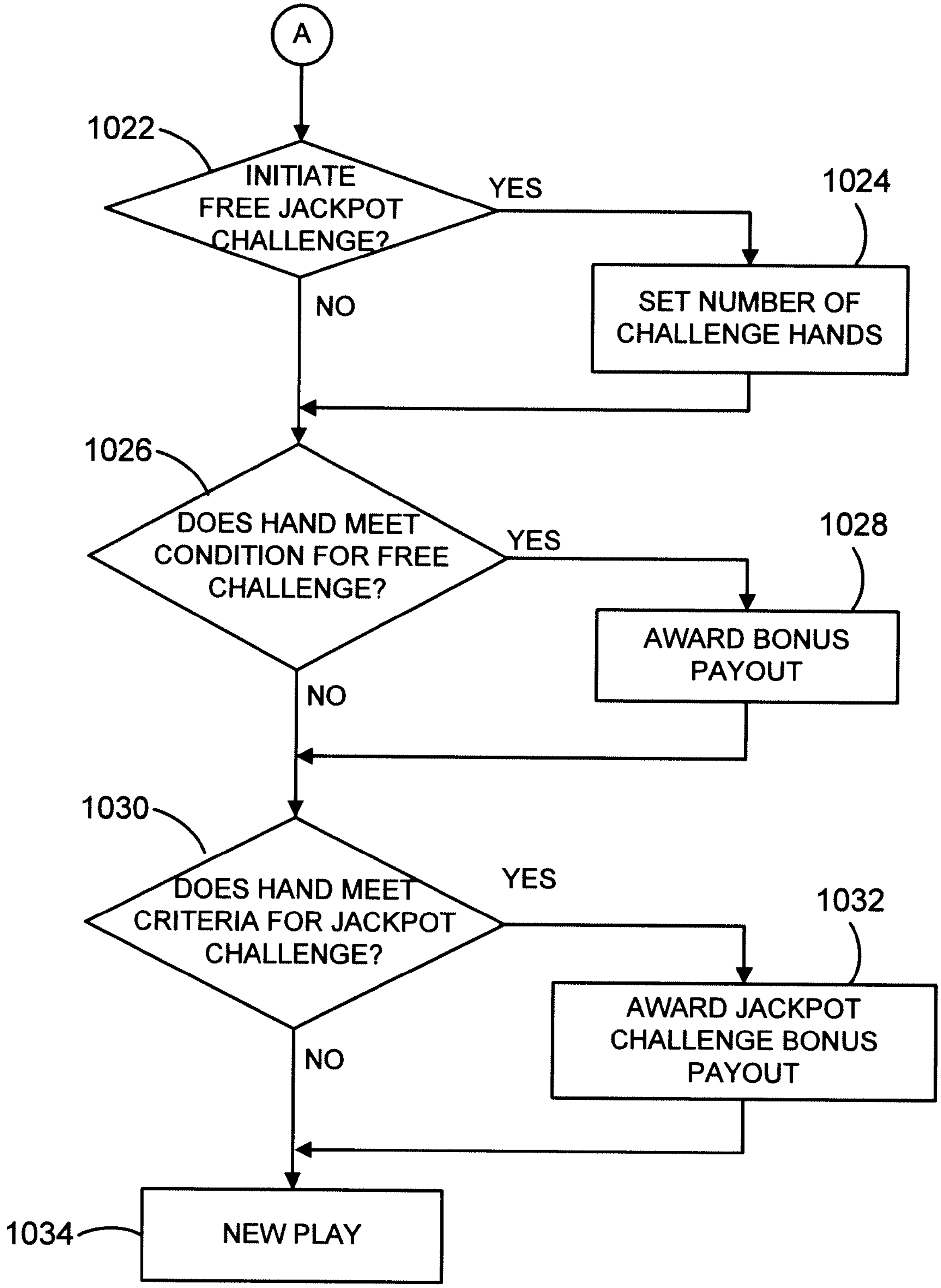

FIGS. 10*a* and 10*b*, described by way of example above, represents one algorithm that corresponds to the at least some instructions executed by the controller 42 and/or external systems 46 in FIG. 2 to perform the above described functions associated with the disclosed concepts. In this instance the algorithm conducts a poker-themed wagering game for a player. The wagering game includes a game sequence in which a player makes a wager and a wagering game outcome is determined. The wagering game using a gaming apparatus such as the gaming machine 10 in FIG. 1*a* or the handheld gaming machine in FIG. 1*b* to receive inputs from the player and to generate wagering game outcomes that are communicated to the player, the gaming apparatus generally includes a user interface device such as user inputs 26 in FIG. 1*a* configured to receive an input from the player, a display device configured to display information or graphics to be viewed by the player such as the primary display area 14 in FIG. 1*a*, one or more storage devices, and one or more processors configured to execute computer instructions relating to the wagering game such as the controller 42 in FIG. 2.

In step 1000, a player at the gaming terminal 10 begins a gaming session for playing the wagering game by any conventional method (e.g., inserting coins or using credits). The player then selects an amount to make a base wager on the upcoming user-playable hand and makes a player input at step 1002. The player input base wager is accepted at the user interface device and is transformed into electronic data signals indicative of a wager to play the wagering game in step 1002. One of the gaming apparatus processors such as the controller 42 interprets the base wager from the data signals and to, at least in part, cause the recording of a digital representation of the wager in the gaming apparatus storage device. One of the processors such as the controller 42 causes the display of a visual indication of the wager on the display device such as the primary display area 14. One of the gaming apparatus processors such as the controller 42 initiates a game sequence of the wagering game on the gaming apparatus.

At decision box 1004, a determination is made as to whether to trigger a buy-in challenge such as a jackpot challenge by whether the player has made an additional side wager separate from the base wager. If the determination is made to trigger a buy-in challenge, the algorithm sets a predetermined number of future plays of the wagering game to meet a condition in step 1006.

The gaming terminal 10 will display a user-playable hand at step 1008 on the primary display area 14. A determination is then made at step 1010 whether the user-playable hand creates one of the five-card hands for which a payout is awarded (e.g., straight, flush, full-house, etc.). If the first user-playable hand does form a five-card hand with a payout value, then a payout is awarded at step 1012.

If the determination is made at decision box 1010 that a specified five-card user-playable hand has not been formed, then the player is allowed to select none, one, or more of the cards to hold at step 1014. According to one embodiment of the present invention, the player is must hold any card which forms a hand specified in the pay table 308 (e.g., for a jacks or better pay table, a player would have to hold a queen if a pair of queens was a part of the first user-playable hand).

Once the player has selected which (if any) cards to hold at step 1014, the remaining non-selected cards are discarded and replaced and a hand ranking is then established for the user-playable hand at step 1016. At decision box 1018, a determination is made as to whether the hand meets the predetermined criteria contained in the pay table 308. If the hand does meet the predetermined criteria, a primary payoff is awarded at step 1020. Once a primary payoff is awarded at step 1020, the algorithm proceeds to step 1022 where it is determined whether a free challenge is triggered based on the hand.

If a free challenge is triggered in step 1022, a number of future hands is set in step 1024 that provides the amount of hands to meet the conditions of the challenge and the algorithm continues to the next step. The algorithm then determines whether the hand meets an existing free challenge in step 1026. If the hand meets an existing free challenge, a bonus award is awarded to the player in step 1028.

The algorithm then determines whether the hand meets an existing jackpot challenge in step 1030. In order to trigger any challenge conditions, a challenge must first be active, a maximum bet must be made on the current play in this example at a minimum and the hand is then eligible for the jackpot challenge. If the hand meets an existing jackpot challenge in step 1030, a bonus award for meeting the condition is awarded in step 1032. The algorithm then proceeds to offer the player a new play in step 1034.

It should be understood that the above invention is not limited to a video poker system and may be instituted on a standard casino table or another means sufficient to conduct the above described wagering game.

Each of these embodiments and obvious variations thereof is contemplated as falling within the spirit and scope of the claimed invention, which is set forth in the following claims.

What is claimed is:

1. A gaming system comprising:

one or more display devices configured to display graphics showing a poker wagering game;

one or more wager input devices for receiving input from a player indicative of a base wager to play the poker wagering game;

one or more memory devices; and one or more processors coupled to at least one of the one or more displays, at least one of the one or more wager input devices, and at least one of the one or more memory devices, the one or more processors being configured to execute computer instructions relating to the poker wagering game operative to:

deal a plurality of playing cards to form a user-playable poker hand;

award a payoff based on a poker ranking of the user-playable poker hand meeting a predetermined criterion; and receive a side wager separate and in addition to the base wager from the player, the side wager allowing the player to select at least one of a plurality of challenges to be triggered, each of the plurality of challenges requiring the player to meet a condition of obtaining a predetermined poker hand in at least one of a predetermined number of future plays of the poker wagering game.

2. The gaming system of claim 1, wherein the one or more processors deal the plurality of playing cards to form a user-playable poker hand by:

dealing an initial plurality of playing cards;

discarding, via player selection, one or more of the dealt playing cards from the initial plurality of playing cards; and replacing each of the discarded playing cards with a replacement playing card to form the user-playable poker hand.

3. The gaming system of claim 1, wherein the one or more processors offers an additional free challenge if the user-playable poker hand meets a predetermined free-challenge criteria, the additional free challenge based on meeting a free-challenge condition in at least one of a second predetermined number of future plays of the poker wagering game.

4. The gaming system of claim 1, wherein the condition is met based on the user-playable poker hands in the future predetermined number of future plays meeting a predetermined criterion for a repeated number of plays of the poker wagering game.

5. The gaming system of claim 1, wherein meeting the condition of the challenge results in a bonus award of a set credit amount, a progressive bonus award or a reduced input wager to initiate the poker wagering game until the end of the predetermined number of future plays of the poker wagering game.

6. The gaming system of claim 1, wherein the probability of meeting the condition of the challenge is a function of the number of poker wagering games played in the predetermined number of future plays of the poker wagering game.

7. The gaming system of claim 1, wherein meeting the condition increases the probability of being awarded the payoff based on a ranking of the user-playable poker hand in each of the remaining plays of the predetermined number of future plays of the poker wagering game.

8. The gaming system of claim 7, wherein meeting the condition allows the player additional playing cards in the remaining plays of the predetermined number of future plays of the poker wagering game.

9. The gaming system of claim 1, wherein meeting the condition in any of the plays of the predetermined number of future plays of the poker wagering game unlocks additional challenges for the player, the additional challenges based on meeting another condition in at least one of another predetermined number of future plays of the poker wagering game.

10. The gaming system of claim 1, wherein the challenges remain active if the player returns at a future time to continue playing the predetermined number of future plays of the poker wagering game.

11. The gaming system of claim 1, wherein each of the plurality of challenges has a different predetermined number of future plays of the poker wagering game, and the side wager has an amount scaled to the different predetermined number of future plays of the selected challenge.

12. A gaming system comprising:

one or more display devices configured to display graphics showing a poker wagering game;

one or more wager input devices for receiving a player input indicative of a base wager to play the poker wagering game;

one or more memory devices; and one or more processors coupled to at least one of the one or more displays, at least one of the one or more wager input devices and at least one of the one or more memory devices, the one or more processors being configured to execute computer instructions relating to the poker wagering game operative to:

deal a plurality of playing cards to form a user-playable poker hand;

award a payoff based on a poker ranking of the user-playable poker hand meeting a predetermined criterion; and trigger a plurality of different challenges to a player for a predetermined number of future plays of the poker wagering game, at least one of the different challenges being selected by the player from a plurality of challenges based on receiving a side wager separate and in addition to the base wager, each of the plurality of challenges including a challenge with a condition of obtaining a predetermined poker hand that when met results in a bonus award having a fixed credit value awarded to the player in addition to any payoff from the user-playable poker hand.

13. The gaming system of claim 12, wherein the plurality of different challenges is triggered by a player possessing a token.

14. The gaming system of claim 12, wherein the plurality of different challenges is triggered by an outcome in the poker wagering game or by the player applying at least part of the payoff from the user-playable poker hand.

15. The gaming system of claim 12, wherein the one or more processors offers an additional free challenge if the user-playable poker hand meets a predetermined free-challenge criteria, the additional free challenge based on meeting a free-challenge condition in at least one of a second predetermined number of future plays of the poker wagering game.

16. The gaming system of claim 12, wherein the condition is met based on the user-playable hands in the future predetermined number of future plays meeting a predetermined criterion for a repeated number of plays or meeting predetermined challenge criterion in consecutive future plays of the poker wagering game.

17. The gaming system of claim 12, wherein meeting a condition of at least one challenge of the plurality of challenges results in a progressive bonus award.

18. The gaming system of claim 12, wherein a probability of meeting the condition of at least one challenge of the plurality of challenges is a function of the number of poker wagering games played in the predetermined number of future plays of the poker wagering game.

19. The gaming system of claim 12, wherein meeting a condition of at least one challenge of the plurality of challenges in any of the plays of the predetermined number of future plays of the poker wagering game unlocks additional challenges for the player, the additional challenges based on meeting another condition in at least one of another predetermined number of future plays of the poker wagering game.

20. The gaming system of claim 12, wherein the challenges remain active if the player returns at a future time to continue playing the predetermined number of future plays of the poker wagering game.

21. A method of conducting a poker wagering game for a player, the poker wagering game including a game sequence in which a player makes a base wager and a wagering game outcome is determined, the method comprising:

conducting the poker wagering game using a gaming apparatus to receive inputs from the player and to generate wagering game outcomes that are communicated to the player, the gaming apparatus including one or more user interface devices, one or more display devices, one or more storage devices, and one or more processors configured to execute computer instructions relating to the wagering game;

accepting, at the one or more user interface devices the base wager from the player to play the wagering game;

dealing a plurality of playing cards to form a user-playable poker hand via the one or more processors;

awarding a payoff based on a poker ranking of the user-playable poker hand meeting a predetermined criterion;

receiving an extra wager separate and in addition to the base wager from the player, the extra wager allowing the player to select at least one of a plurality of challenges to be triggered, each of the plurality of challenges requiring the player to meet a condition of obtaining a predetermined poker hand in at least one of a predetermined number of future plays of the poker wagering game; and determining an outcome of the game sequence.

22. The method of claim 21, wherein dealing the plurality of playing cards to form a user-playable poker hand includes:

dealing an initial plurality of playing cards;

discarding, via player selection, one or more of the provided playing cards from the initial plurality of playing cards; and replacing each of the discarded playing cards with a replacement playing card to form the user-playable poker hand.

23. The method of claim 21, further comprising offering an additional free challenge if the user-playable poker hand meets a predetermined free-challenge criteria, the additional free challenge based on meeting a free-challenge condition in at least one of a second predetermined number of future plays of the poker wagering game.

24. The method of claim 21, wherein the condition is met based on the user-playable poker hands in the predetermined number of future plays meeting predetermined challenge criterion in consecutive future plays or for a repeated number of plays of the poker wagering game.

25. The method of claim 21, wherein meeting the condition of the challenge results in a bonus award of a set credit amount, a progressive bonus award, or a reduced wager input to initiate the poker wagering game until the end of the predetermined number of future plays of the poker wagering game.

26. The method of claim 21, wherein the probability of meeting the condition of the challenge is a function of the number of games played in the predetermined number of future plays of the poker wagering game.

27. The method of claim 21, wherein meeting the condition increases the probability of being awarded the payoff based on a ranking of the user-playable hand in each of the remaining plays of the predetermined number of future plays of the poker wagering game.

28. The method of claim 27, wherein meeting the condition allows the player additional playing cards in the remaining plays of the predetermined number of future plays of the poker wagering game.

29. The method of claim 21, wherein meeting the condition in any of the plays of the predetermined number of future plays of the poker wagering game unlocks additional challenges for the player, the additional challenges based on meeting another condition in at least one of another predetermined number of future plays of the poker wagering game.

30. The method of claim 21, wherein the challenges remain active if the player returns at a future time to continue playing the predetermined number of future plays of the poker wagering game.

31. A method of conducting a poker wagering game for a player, the poker wagering game including a game sequence in which a player makes a base wager and a wagering game outcome is determined, the method comprising:

conducting the poker wagering game using a gaming apparatus to receive inputs from the player and to generate wagering game outcomes that are communicated to the player, the gaming apparatus including one or more user interface devices, one or more display devices, one or more storage devices, and one or more processors configured to execute computer instructions relating to the wagering game;

accepting, at the one or more user interface devices the base wager from the player to play the poker wagering game;

dealing a plurality of playing cards to form a user-playable poker hand via the one or more processors;

awarding a payoff based on a poker ranking of the user-playable poker hand meeting a predetermined criterion;

triggering a plurality of different challenges to a player for a predetermined number of future plays of the poker wagering game, at least one of the different challenges being selected by the player from a plurality of challenges based on receiving a side wager separate and in addition to the base wager, each of the plurality of challenges including a challenge with a condition of obtaining a predetermined poker hand that when met results in a bonus award having a fixed credit value awarded to the player in addition to any payoff from the user-playable poker hand; and determining an outcome of the game sequence.

32. The method of claim 31, wherein the plurality of different challenges is triggered by a player possessing a token.

33. The method of claim 31, wherein the plurality of different challenges is triggered by an outcome in the poker wagering game or by the player applying at least part of the payoff from the user-playable poker hand.

34. The method of claim 31, further comprising offering an additional free challenge if the user-playable poker hand meets a predetermined free-challenge criteria, the additional free challenge based on meeting a free-challenge condition in at least one of a second predetermined number of future plays of the poker wagering game.

35. The method of claim 31, wherein the condition is met based on the user-playable poker hands in the future predetermined number of future plays meeting a predetermined criterion for a repeated number of plays or meeting predetermined challenge criterion in consecutive future plays of the poker wagering game.

36. The method of claim 31, wherein meeting a condition of at least one challenge of the plurality of challenges results in a progressive bonus award.

37. The method of claim 31, wherein the probability of meeting the condition of the challenge is a function of the number of games played in the predetermined number of future plays of the poker wagering game.

38. The method of claim 31, wherein meeting a condition of another challenge of the plurality of challenges in any of the plays of the predetermined number of future plays of the poker wagering game unlocks additional challenges for the player, the additional challenges based on meeting another condition in at least one of another predetermined number of future plays of the poker wagering game.

39. The method of claim 31, further comprising keeping the challenge active if the player returns at a future time to continue playing the predetermined number of future plays of the poker wagering game.

* * * * *